United States Patent [19]
Erickson

[11] Patent Number: 4,806,610
[45] Date of Patent: Feb. 21, 1989

[54] METHOD FOR MAKING LATICES

[75] Inventor: David E. Erickson, Stow, Ohio

[73] Assignee: GenCorp Inc., Akron, Ohio

[21] Appl. No.: 49,893

[22] Filed: May 15, 1987

[51] Int. Cl.$^4$ ............................................. C08H 1/00
[52] U.S. Cl. ................................... 527/201; 527/207;
523/300; 162/164.1; 162/168.1; 162/169;
252/302; 252/303; 252/304
[58] Field of Search ....................... 527/207, 201, 200;
523/300; 162/164.1, 168.1, 169; 252/303, 303, 304

[56] References Cited
U.S. PATENT DOCUMENTS
4,607,089 8/1986 Riley et al. .......................... 527/201

FOREIGN PATENT DOCUMENTS
976214 11/1964 United Kingdom .
1583864 2/1981 United Kingdom .

Primary Examiner—Maurice J. Welsh
Assistant Examiner—Nathan M. Nutter

[57] ABSTRACT

Continuous homogenization during the free radical aqueous graft or over copolymerization of an unsaturated monomer on a protein provides a latex of reduced viscosity.

8 Claims, No Drawings

METHOD FOR MAKING LATICES

This invention relates to grafted protein latices paper contains no surfactant. Although some property improvements were found with this new product, some problems developed. When produced at solids contents greater than 31–32 percent, the latices had high viscosities. The high viscosity presents problems during latex manufacturing (poor heat transfer) as well as difficult subsequent pumping, etc. In addition, the low solids and/or high viscosity of those latices were considered a hindrance to their commercialization. The latex viscosities were reported to drop somewhat on aging; also, somewhat lower viscosities were obtainable using incrementing of protein solutions and monomers. However, the praotioal solids limit still oould not be raised above 34–35 percent.

OBJECTS

An object of this invention is to avoid the difficulties alluded to above and to provide a method for making a grafted protein latex having reduced viscosity.

Another object of this invention is to provide a grafted protein latex having reduced viscosity.

These and other objects and advantages of this invention will become apparent to those skilled in the art from the following detailed description and working example.

SUMMARY OF THE INVENTION

According the the present invention it has been found that latices employing proteins can be made to lower viscosities by continuously homogenizing the aqueous mixture during the course of graft copolymerization. Because of this beneficial effect on viscosity, such latices can be prepared at higher solids content than normally are practical without homogenization, thus improving handleability of the higher solids products and increasing the range of coating formulations in which such latices could be used.

DISCUSSION OF DETAILS AND PREFERRED EMBODIMENTS

The graft copolymerization is done in alkaline aqueous media. The protein is dissolved or rendered finely divided (colloidal suspension) in aqueous ammonium hydroxide or other suitable aqueous alkaline material before polymerization is initiated by an azo initiator. In the graft copolymerization the polymerizable unsaturated monomer is used in an amount of from about 90 to 70 parts by weight and the protein is used in an amount of from 10 to 30 parts by weight, the total of the ingredients being 100 parts by weight. In this graft polymerization process, added emulsifiers, colloids or surfactants are not needed.

Proteins, of course, in various forms are well know materials and have many uses. Please see "Encyclopedia of Polymer Science and Technology," John Wiley & Sons, Inc., Vol. 2 (1965), Vol. 8 (1968), Vol. 9 (1968), Vol. 11 (1969) and Supplement Vol. 2 (1977).

For example, they may be obtained as hydrolyzed collagen from fish and animal skin and bones, as albumen from blood and egg white, as casein from milk, as the gluten fractions from corn and wheat and/or the proteins derived from seeds and the like such as soy beans, e.g., soy protein (preferred).

The polymerizable monomers to be grafted to or over copolymerized with the protein have not over 14 carbon atoms. Examples of such monomers are the conjugated dienes like piperylene, butadiene-1,3, isoprene, 2,3-dimethyl butadiene, chloroprene and the like; a nitrile like acrylonitrile and methacrylonitrile; an amide like acrylamide, methacrylamide and ethacrylamide; an acrylate like methyl acrylate, ethyl acrylate, butyl acrylate, ethyl hexyl acrylate and octyl acrylate; an alkacrylate like methyl methacrylate, ethyl methacrylate, butyl methacrylate, methyl ethacrylate, ethyl ethacrylate, butyl ethacrylate, hydroxyethyl methacrylate and octyl ethacrylate; a vinyl aryl monomer like styrene, alpha methyl styrene, p-tertiary butyl styrene, divinyl benzene, methyl vinyl toluene and para vinyl toluene; a pyridine like 2-vinyl pyridine, 4-vinyl pyridine, 2-methyl-5-vinyl pyridine and 5-ethyl-2-vinyl pyridine; and the like and mixtures thereof.

A chelating agent is used in a very minor amount sufficient to chelate any interfering ions such as the ferric or ferrous ion, or other polymerization interfering ion or material. In general it is used in an amount of from about 0.01 to 1.0, preferably about 0.05, part by weight per 100 parts by weight of the monomer(s) and protein. Examples of some chelating agents are trisodium ethylene diamine tetraacetate dihydrate (preferred), ethylenediaminetetraacetic acid tetrasodium salt, technical ethylenediaminetetraacetic acid tetrasodium salt, ethylenediaminetetraacetic acid tetrasodium salt dihydrate, ethylenediaminetetraacetic acid trisodium salt monohydrate, ethylenediaminetetraacetic acid disodium salt dihydrate, ethylenediaminetetraacetic acid, nitrilotriacetic acid disodium salt monohydrate, nitrilotriacetic acid, N-hydroxyethyl-ethylenediaminetriacetic acid trisodium salt, N-hydroxyethyl-ethylenediaminetriacetic acid trisodium salt dihydrate, ethanoldiglycine disodium salt (or disodium N-hydroxyethyliminodiacetic acid), diethanolglycine sodium salt (or sodium dihydroxyethyl glycine) and the like and mixtures of the same.

The initiator or catalyst used is an oil soluble azo initiator or catalyst. Azo initiators for free radical polymerization are well known. In this connection please see the "Encyclopedia Of Polymer Science And Technology," Vol. 2, 1965, pages 278–295, John Wiley & Sons, Inc. Of these initiators it is preferred to use the azonitriles. Examples of some of these compounds are azobisdimethylvaleronitrile, 2,2'-azobisisobutyronitrile (preferred), 2,2'-azobis-2-methylbutyronitrile and 2,2'-azobis (methylisobutyrate) and the like and mixtures of the same. Only minor amounts by weight of the initiator are necessary to effect copolymerization.

Chain transfer agents or modifiers are used during the graft copolymerization to control molecular weight, gel and so forth. While various modifiers or chain transfer agents have been proposed and may be used such as benzene, toluene, triphenyl methane, carbon tetrachloride and so forth, it is preferred to use mercaptans such as the alkyl and/or aralkyl mercaptans of from 8 to 18 carbon atoms of which the tertiary alkyl mercaptans are much preferred. Examples of some mercaptans are n-octyl mercaptan, n-dodecyl mercaptan, t-octyl mercaptan, t-dodecyl mercaptan (also preferred), p-tridecyl mercaptan, tetradecyl mercaptan, hexadecyl mercaptan and so forth and mixtures thereof. These modifiers are used generally in a total amount of from about 0.15 to 0.9 phm (parts 100 parts monomer).

Temperatures used during graft copolymerization should be sufficient to effect polymerization by activation of the catalyst and double bonds of the monomer(s). They should not be too high to cause a runaway reaction and not too low to retard polymerization. In general, the temperature is preferably from about 40° to 80° C. Times for polymerization may vary from about 8 to 14 hours depending on the degree of polymerization desired. Generally, it is desired to carry polymerization to about 100% conversion.

The graft copolymerization should be conducted under alkaline conditions utilzing materials like NH$_4$OH and the like. In general the pH of the polymerization media should be from about 8.5 to 10, preferably from about 9 to 9.5.

The water used during graft copolymerization should be free of deleterious materials and preferably should be distilled or ion exchanged. Sufficient water is used to enable maintenance of the emulsion or latex and to enable proper mixing or stirring of the ingredients during polymerization to obtain the desired rate and degree of polymerization, heat transfer and so forth. The solids content may be up to about 40% by weight.

Graft copolymerization should be conducted in a closed reactor, such as a pressure reactor, fitted with a stirrer or other agitating means, evacuating means, heating and cooling means, with means to flush with or pump in an inert gas such as nitrogen, helium, argon, neon and the like if desired, with means to charge monomer(s), protein, water, initiators, venting means, and with means to recover the polymer and so forth. The reactor should be cleaned or flushed between polymerization runs to remove traces of initiators, modifiers, residues and so forth which might interfere with subsequent polymerizations. There should be sufficient agitation or stirring of the polymerization media to ensure thorough mixing, diffusion, contact and so forth. The homogenizer used in the example was a Model 25 MBA Laboratory Homogenizer manufactured by Manton Gaulin Manufacturing Co. (now Gaulin Corporation), Everett, Mass. The unit was operated at 2000 psig in all of the runs, although it is capable of being used at pressures up to 5000 psig. The throughput rate through the homogenizer was 25 gallons/hour (ca 1.6 1/min.).

Free radical aqueous polymerization and copolymerization of ethylenically unsaturated monomers are well known to those skilled in the art. In this connection please see Whitby et al, "Synthetic Rubber," John Wiley & Sons, Inc., New York, 1954; Bovey et al, "Emulsion Polymerization," High Polymers, Vol. IX, Interscience Publishers, Inc., 1955; Schildknecht, "Vinyl and Related Polymers," John Wiley & Sons, Inc., New York, 1952 and "Encyclopedia of Polymer Science and Technology," Vol. 3 (1965), Vol. 5 (1966), Vol. 7 (1967), Vol. 9 (1968) and Vol. 11 (1969), Interscience Publishers, a division of John Wiley & Sons, Inc., New York.

In the practice of the present invention, the polymerization may be considered as a graft copolymerization, over copolymerization, core/shell copolymerization or an interpolymerization. The technique of polymerizing or copolymerizing one or more monomers in the presence of a polymer or a substrate, "grafting technique," is known and is frequently called graft polymerization or graft copolymerization. In this connection, please see "Proceedings Of The Third Rubber Technology Congress," 1954, W. Heffer & Sons, Ltd., Cambridge, pages 185-195; "Copolymerization," High Polymers, Vol. XVIII, Ham, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; "Block and Graft Copolymerization," Ceresa, Vol. 1 (1973) and Vol. 2 (1976), John Wiley & Sons, Ltd., New York and "Graft Copolymers," Polymer Reviews, Vol. 16, Battaerd and Tregear, Interscience Publishers, a division of John Wiley & Sons, New York, 1967. The graft copolymer may contain all graft copolymer but also may be a mixture of homopolymers, copolymers as well as the graft itself, depending on the rate of polymerization of the monomer(s), the polymerization conditions and so forth.

The graft copolymer latices of the present invention can be treated during or after polymerization with antioxidants, biocides, defoamers, additional alkaline material such as NH$_4$OH and so forth.

All of the graft copolymerization ingredients may be charged to the reactor at once and graft copolymerization continued to completion or a seed type of latex may be formed by first graft copolymerization of part of the monomer(s) on the protein in the presence of some of the polymerization materials followed by further additions of monomers along with the remaining polymerization materials.

The latices of the present invention can be mixed with finely divided fillers such as paper coating fillers like clays, kaolin, calcium carbonate, titanium dioxide, zinc oxide and other inorganic fillers used in paper coating compositions. Thickening agents, viscosity stabilizers, additional alkaline material like NH$_4$OH and so forth can be added to these compositions. In general paper coating compositions of the present invention will have a solids content of from about 20 to 70% by weight. The solids comprising from about 2 to 20% by weight, on a dry weight basis, of the graft copolymer and from 98 to 80% by weight of the paper coating fillers. The paper coating composition may be spread on paper and hot calendered to cure or set the graft copolymer and form an adherent and dried coating on the paper. For example, in some paper coating latices an acid containing comonomer is used, but, here, such a —COOH containing monomer is not needed. In using the latex in a paper coating composition additional cobinder is not required. The latex is useful as a binder for pigmented paper coating compositions to be printed by gravure or offset printing processes and is particularly useful in compositions for lightweight paper to be printed by the gravure process. The latex, also, can be used in compositions for cylinder boards.

The following example will serve to illustrate the present invention with more particularity to those skilled in the art. In the example the parts are parts by weight unless otherwise indicated.

TABLE I
RECIPES FOR PROTEIN-MODIFIED STYRENE-ACRYLATE LATEXES

| INGREDIENTS | ACTIVE PARTS | WEIGHTS, AS-IS (g) A | B |
|---|---|---|---|
| Styrene | 46.57 | 1224 + 80[(1)] | 1534 + 100[(1)] |
| Butyl acrylate | 53.43 | 1496 | 1875 |
| PP2500 (soy protein) | 17.14 | 480 | 602 |
| SULFOLE 120 | .5 | 14 | 17.6 |
| VAZO 64 | 1.07 | 20 + 10[(1)] | 25 + 12.5[(1)] |
| SEQUESTRENE Na$_{3T}$ | .07 | 2 | 2.5 |

TABLE I-continued
RECIPES FOR PROTEIN-MODIFIED STYRENE-ACRYLATE LATEXES

| | | | |
|---|---|---|---|
| DREW L-198 | .14 | 4 | 5 |
| PROXEL GXL (25%) | .18 | 20 | 25 |
| 28% Aqueous NH$_3$ | .8 | 80 | 100 |
| Deionized Water | — | 6820 | 5983 |
| Totals - | 119.9 | 10250 | 10281.6 |

| | |
|---|---|
| SEQUESTRENE Na$_{3T}$ | Trisodium ethylene diamine tetraacetate dihydrate. Technically pure. Ciba-Geigy Corp. |
| SULFOLE 120 | t-dodecyl mercaptan, avg. mol. wt. 198, calc. purity wt. % 96.8 and mercaptan sulfur wt. % 15.4. Phillips Petroleum Co., Rubber Chem. Div. |
| DREW L-198 | Emulsifiable mixture of mineral oil, silica derivatives and esters. Defoamer. Drew Chemical Corp. |
| PROXEL GXL | Chemical biocide. ICI Americas Inc. |
| VAZO 64 | 2,2'-azobisiobutyronitrile or $(CH_3)_2(CN)CN=NC(CN)(CH_3)_2$. duPont. |
| PP2500 | Ralston Purina Company Polymer PP2500, The Ralson Purina Company, St. Louis, Mo., is an anionic carboxylated soy protein in powder form. At 20% solids in alkaline media it has a Brookfield viscosity of about 2500 RVT (10 RPM) at 25° C. See U.S. Pat. No. 4,474,694. Protein was first solubilized in ammonia. |

POLYMERIZATION PROCEDURE 1. Aqueous solutions (deionized water, PROXEL, DREW and SEQUESTRENE were heated in a five gallon reactor, with stirring, to 65.5° C. (150° F.). 2. Soy protein (PP2500) was added with stirring and stirring was continued for five minutes to wet out the protein properly. The reactor contents were degassed (vacuum) and purged with nitrogen. 3. Ammonia solutions were added, and the contents were stirred for 30 minutes. 4. Premixed monomer solutions (styrene, butyl acrylate, SULFOLE, VAZO) were pressured into the reactor over a ca. three hour period using nitrogen. 5. Polymerizations were continued for two to three more hours at 65.5° C. (150° F.) on the first day. Polymerization batches were cooled overnight and then were reheated to 65.5° C. the next day. 6. Added increments (styrene +VAZO 64) as indicated. Polymerization was conducted at 65.5° C. for six more hours. 7. The homogenizer (2,000 psig) was started at the time the monomers were pumped into the reactor and continued throughout the polymerization on both days. Control latices were not passed through the homogenizer. 8. Total polymerization time was about 8 to 10 hours.

9. Latex was fed from the bottom of the reactor into the Manton Gaulin Model 25 MBA Laboratory Homogenizer. The throughput rate through the homogenizer was 25 gallons/hour (ca. 1.6 1/minute). The homogenized latex was continuously fed back into the top of the reactor.

TABLE II
EFFECTS OF HOMOGENIZATION DURING LATEX POLYMERIZATION ON VISCOSITY AND LIGHT TRANSMISSION

| RUN NO. | LATEX | CONTINUOUS HOMOGENI- ZATION | SOLIDS CONTENT % (g) | CONVERSION % | Brookfield Visc.[a] (CPS) (SPINDLE) | Haake Rotovisco[d] Viscosity (mPa sec) 270 sec$^{-1}$ | 2700 sec$^{-1}$ | % Light Transmission[c] Initial | Filtered[f] |
|---|---|---|---|---|---|---|---|---|---|
| 1 | A | yes | 29.6 | 91 | 14.3[1] | 10 | 9.5 | 51 | 88 |
| 2 | A | no | 31.2 | 96 | 38.2[1] | 25.1 | 17.1 | 67 | 89 |
| 3 | A | no[b] | 29.6 | — | 26.0[1] | 20.0 | 14.4 | — | — |
| 4 | B[e] | yes | 36.9 | 92 | 243[2] | 69.2 | 36.3 | 64 | 85 |
| 5 | B | yes | 40.6 | 100 | 138[2] | 54.1 | 30.4 | 62 | 83 |
| 6 | B[e] | no | 38.3 | 96 | 580[3] | 118 | 54.5 | 60 | 90 |
| 7 | B | no[b] | 36.9 | — | 338[2] | 89.7 | 44.3 | — | — |
| 8 | B | no | 40.3 | 99 | 354[2] | 92.3 | 49.9 | 57 | 93 |

[a]Brookfield Model LVF Viscometer, 60 rpm, 25° C., spindle indicated.
[b]Diluted with distilled, deionized water for better comparison with other latices.
[c]Light transmission measurements made using a Rao (Brice/Phoenix type) light scattering photometer, cylindrical cell, 546 μm green light beam; samples were diluted to 0.0025 percent solids with distilled, deionized water.
[d]Haake Rotovisco Model RV 100, NV Rotor, 25° C., used to determine shear rates.
[e]Latex samples were taken from the reactor after 4–6 hours (first day), before incremental addition. Theoretical solids content, 40.0%.
[f]After filtering through 1.2 μm Millipore filter.
[g]Solids content of latex at end of polymerization.
mPa — millipascal

RESULTS

Viscosity and light transmission results obtained on the protein-modified styrene/butyl acrylate latices are summarized in Table II. Viscosities were determined both on the "as polymerized" latices (which had slightly differing solids contents due to variations in monomer addition rates) and, in some cases, on the latices diluted to allow comparison to be made at the same solids contents.

The viscosities of the latices made using continuous homogenization are significantly lower than viscosities of the corresponding standard latices (no homogenization). The differences are greater at the lower shear rates (Brookfield and low shear Haake results), suggesting that the homogenized latices have less particle-to-particle interaction than the standard latices.

The light transmission results obtained are not as definitive. Results on the first latex pair in this series (Runs Nos. 1 vs 2 and 3) indicate that the average particle size of the latex formed with continuous homogenization (Run No. 1) is larger than that of the comparison latices. That is, the light transmission of Run No. 1 is lower than that of Runs Nos. 2 and 3. The light transmissions of the latices were much higher (and equivalent) after filtration through 1.2 mm filters, indicating that some extremely large particles were originally present in each latex. Thus, the viscosity reduction in the homogenized latex may be due to a combination of two effects, i.e., particle agglomeration and disintegration of some of the extremely large but loose agglomerates.

On the other hand, the light transmission of the higher solids pair of latices indicates a slightly smaller average particle size for the latices formed using continuous homogenization (Runs No. 4 and 5). In this group, the intermediate products are slightly smaller in particle size (higher in light transmission) than the final products. The principal effect of shear in these protein-modified latices is to break up the loose agglomerates, resulting in smaller average particle sizes.

I claim:

1. The method which comprises graft copolymerizing or over copolymerizing on a solubilized protein at least one copolymerizable unsaturated monomer having not over 14 carbon atoms and being selected from the group consisting of conjugated dienes, nitriles, amides, acrylates, alkacrylates, vinyl aryl monomers and vinyl pyridines in aqueous alkaline media using a free radical azo catalyst while continuously homogenizing the aqueous alkaline media during the course of the copolymerization to provide a latex of reduced viscosity, where on a dry weight basis
   (a) said unsaturated monomer is used in an amount of from about 90 to 70 parts by weight and
   (b) said protein is used in an amount of from 10 to 30 parts by weight, the sum of (a) and (b) being 100 parts by weight.
2. The method according to claim 1 where said protein is a soy protein.
3. The method according to claim 1 where said monomer has been added incrementally during the course of the graft or over copolymerization.
4. The method according to claim 1 where said monomer comprises about equal parts by weight of styrene and butyl acrylate.
5. The product produced by the method of claim 1.
6. The product produced by the method of claim 2.
7. The product produced by the method of claim 3.
8. The product produced by the method of claim 4.

* * * * *